United States Patent [19]
Coski

[11] 3,807,885
[45] Apr. 30, 1974

[54] MECHANICAL COLLAR FOR A SHAFT

[76] Inventor: William D. Coski, 3061 69th S.E., Mercer Island, Wash. 98040

[22] Filed: Oct. 18, 1971

[21] Appl. No.: 190,191

[52] U.S. Cl.................. 403/344, 403/282, 85/8.6
[51] Int. Cl.......................... F16b 21/06, F16b 2/10
[58] Field of Search............ 287/52 R, 52.01, 52.06, 287/52.02.52.05; 85/8.6, 8.8; 285/321, 382, 305; 29/229; 24/243.2, 243 B; 403/274, 282, 289, 290, 340

[56] References Cited
UNITED STATES PATENTS

| | | | |
|---|---|---|---|
| 2,025,848 | 12/1935 | Collis | 85/8.6 |
| 3,366,356 | 1/1968 | Fisher | 85/8.6 |
| 3,126,089 | 3/1964 | Hugli | 85/8.6 |
| 1,785,870 | 12/1930 | Marles | 287/52.02 |
| 3,158,917 | 12/1964 | Schlueter | 24/243.2 |
| 2,766,502 | 10/1956 | VonRanson | 24/243 B |
| 1,091,185 | 3/1914 | Boissier | 24/243 B |

*Primary Examiner*—Jordan Franklin
*Assistant Examiner*—Conrad L. Berman
*Attorney, Agent, or Firm*—Christensen, O'Connor, Garrison & Havelka

[57] ABSTRACT

A readily deformable, C-shaped, hunched back, metal collar has a pair of jaws which are recessed apart from one another at the back of the collar. The back recess is bridged by a toggle connection which is angularly deflectable to cause the jaws to engage about a shaft, when the shaft is received in the oblong front recess between the jaws and abutted with the bight connection that joins the jaws between the recesses. The collar may also have a pair of spaced recesses in the jaws thereof, each of which is bridged by a toggle means that acts in a reverse sense to disengage the jaw by articulating the tip portion of the same with respect to the bight-connected proximate end portions of the jaws.

6 Claims, 8 Drawing Figures

MECHANICAL COLLAR FOR A SHAFT

SUMMARY OF THE INVENTION

This invention relates to mechanical collars for shafts, and in particular to collars of this nature which are split to be applied to the shaft in a transverse plane thereof.

As a matter of utility, the collar may be applied to the shaft as a means of developing a flange thereon, such as where it is necessary or desirable to provide a retaining ring on the shaft for some other component journaled thereabout. The shaft may be unrelieved in the plane in which the collar is applied, or it may be recessed to receive the collar in such a way as to locate the collar against axial thrusts thereon.

The split collar of the present invention comprises collet means defining a pair of coplanar jaws which have a bight connection therebetween, and which are spaced apart from one another by a recess that is disposed opposite the bight connection and opens between the jaws, at the outer periphery of the collar, to receive the shaft in abutment with the connection. The collet means also has at least one additional recess therein, which opens to each side of the plane of the jaws, and is disposed on the opposite side of the bight connection from the shaft-receiving recess, whereby the jaws are each rotatable about a point on the connection between the recesses. In addition, means are interposed between the jaws adjacent the additional recess, with which to rotate the jaws in opposite angular directions about the pivot point or points thereof, and to lock the jaws against counter rotation in the relatively rotated condition thereof.

As indicated, the jaws may be rotatable about a single point on the bight connection; or they may be rotatable about a pair of spaced points on the connection. Moreover, in some instances, they may be individually articulated so as to be rotatable about a first point in one direction of rotation thereof, and then each rotated in part in the opposite direction of rotation, about second and third points on opposite sides of the first point.

Where the jaws are rotatable about a single point, the jaw rotating and locking means is spaced apart from the bight connection and interconnected with the respective jaws. Where the jaws are rotatable about spaced points, the jaw rotating and locking means is interconnected with the bight connection and each of the jaws. Where the jaws are rotatable about a first point and then individually articulated about second and third points, the relatively proximate portions of the jaws in the space between the aforesaid second and third points, form a part of the bight connection in the second operation.

In the presently preferred embodiments of the invention, the jaws and bight connection are integral with one another and constructed of a deformable metal or metal-like material. The jaw rotating and locking means takes the form of a toggle connection between opposite sides of the additional recess, as for example, where the jaws are joined across the additional recess by a portion of the deformable material which is either straight or bent in configuration, depending on the direction of rotation to be given the jaws; or where the jaws are connected across the additional recess by a screw device which is threadedly connected with one of the jaws and slidably abutted with the other jaw to rotate the jaws as it is advanced relatively inwardly of the additional recess.

BRIEF DESCRIPTION OF THE DRAWINGS

These features will be better understood by reference to the accompanying drawings which illustrate several of the presently preferred embodiments.

In the drawings.

DESCRIPTION OF THE PREFERRED EMBODIMENTS

Figure 1:
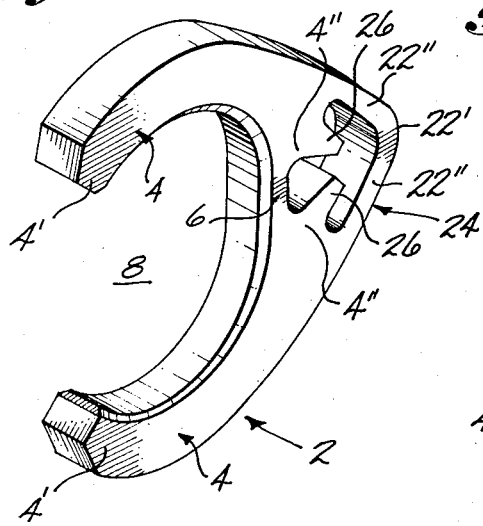
FIG. 1 is a perspective view of one embodiment in the normal condition thereof.

Referring to the drawings, it will be seen that the readily deformable metal collar 2 in FIGS. 1–4 has a generally "hunch-backed" C-shaped profile, and defines a pair of coplanar, collaterally disposed, part-annular jaws 4 which have a bight connection 6 therebetween, and which are spaced apart from one another by an oblong bevel-edged recess 8 that is disposed opposite the bight connection 6 and opens between the jaws, at the outer periphery of the collar, to receive the shaft 10 in abutment with the connection. The shaft 10 has a circumferential groove 12 within which to receive the collar, and the jaws 4 are spaced apart from one another and beveled at their tips 4' so as to slide or otherwise pass conveniently about the inner periphery 14 of the groove 12 in the manner of FIG. 2. When fully seated in the groove, the collar 2 assumes the schematically illustrated condition of FIG. 4, in which the bight connection 6 is abutted with the inner periphery 14 of the groove at a point 18 on the horizontal or minor axis of the recess 8, while the jaws 4 remain spaced apart from the shaft 10 at the vertical or major axis of the recess 8.

Figure 3:
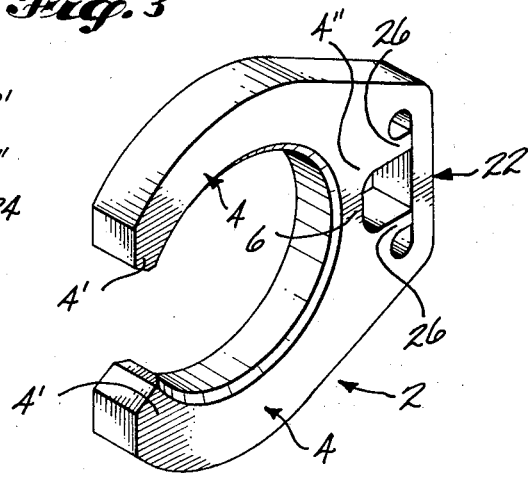
FIG. 3 is another perspective view of the embodiment illustrating its deformed condition on the shaft.
Figure 2:
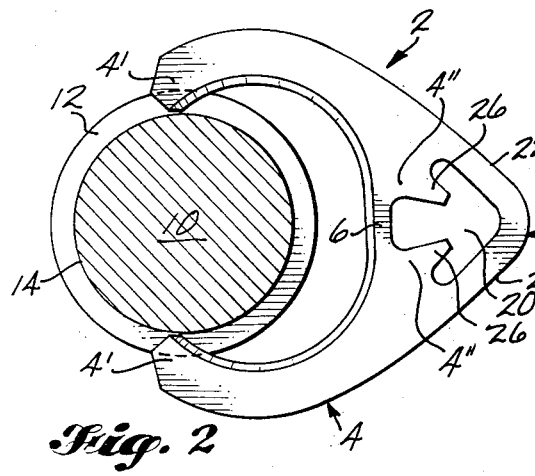
FIG. 2 is a profile view of the embodiment illustrating the manner in which it is applied to a circumferentially grooved shaft.
Figure 4:
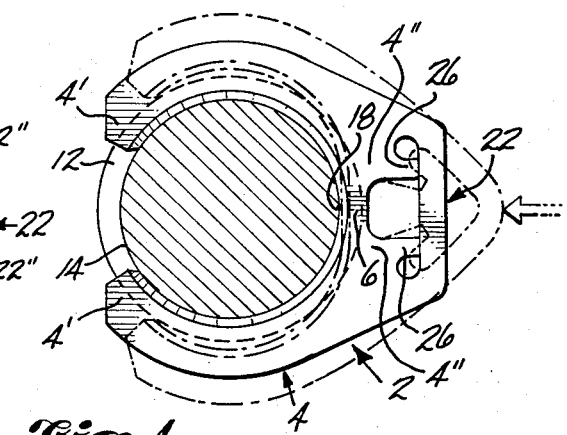
FIG. 4 is another profile view of the embodiment, as well as a schematic view of the same, illustrating the manner in which it is deformed and engaged on the shaft.

The engaged condition is obtained thereafter by deforming the collar 2 in the manner of FIGS. 3 and 4. In profile, the collar has an arrowhead-shaped opening 20 between the jaws, the point of which is oriented in the direction away from the recess 8, so as to form a V-shaped strip 22 across the "hunched" back 24 of the collar, which is opposed to a pair of lobe-like ribs 26 formed on the relatively proximate ends 4'' of the jaws. The ribs 26 are inclined toward one another in the direction of the strip 22, and provide a pair of anvils with which to arrest the deflection of the strip when the knee 22' at the apex of the same is given a blow with a hammer or the like so as to drive the limbs 22'' of the strip into a mutually aligned condition against the ribs 26, as in FIG. 4. This action in turn causes the jaws 4 to pivot relatively toward one another about the point 18, with the effect that the jaws close about the inner periphery 14 of the groove 12, in engagement with the shaft 10.

Figure 5:
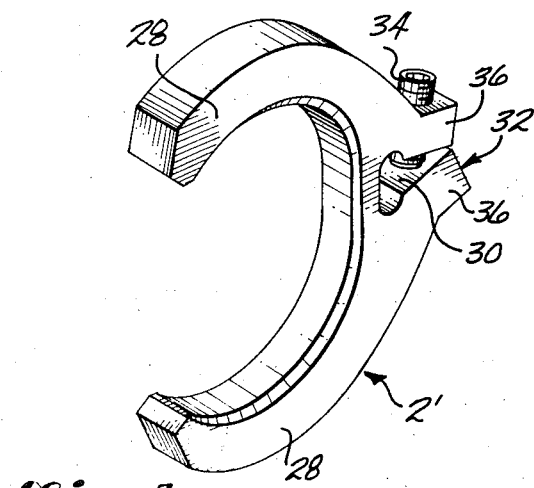
FIG. 5 is a perspective view of a second embodiment in the normal condition thereof.
Figure 6:
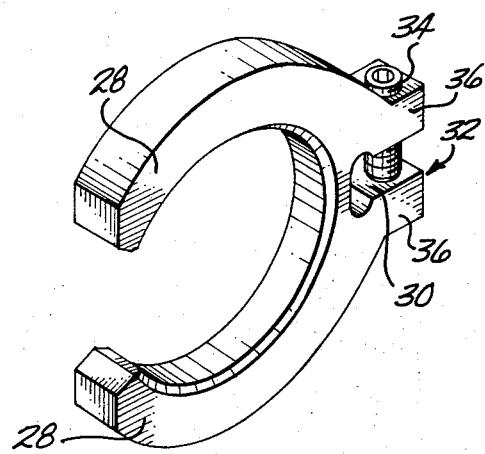
FIG. 6 is another perspective view of this second embodiment in the deformed condition thereof.

This effect may be generated in the manner of FIGS. 1-4 using a toggle connection 22 which is integral with the collar; or it may be generated in the manner of FIGS. 5 and 6 where the jaws 28 are separated by a pinched-closed, slotted recess 30 at the back 32 of the collar 2', and an Allen-headed setscrew 34 which is threaded through one of the two ears 36 on the jaws 28, and slidably abutted against the other ear 36, is used to apply a toggle effect to the jaws 28 as the screw 34 is advanced inwardly of the recess 30 to spread the ears 36 in the manner illustrated.

Figure 7:
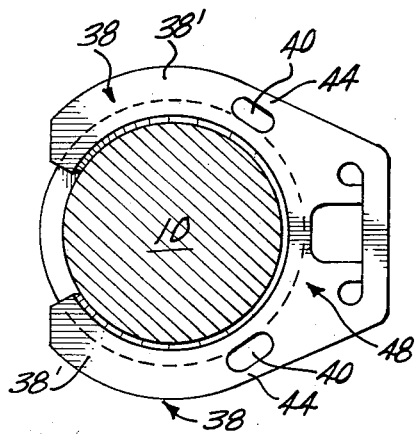
FIG. 7 is a profile view of a third embodiment in the deformed and engaged condition thereof on a shaft.
Figure 8:
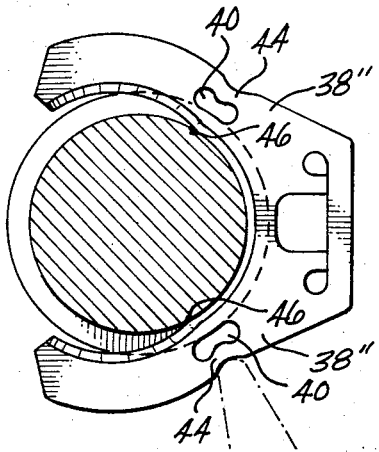
FIG. 8 is a part schematic profile view of this third embodiment illustrating the manner in which it is deformed and disengaged from the shaft.

Moreover, the toggle effect can be used in a reverse sense to open the jaws in the manner of FIGS. 7 and 8. In this instance, the jaws 38 each have an oblong opening 40 in the profile thereof, which is disposed at an intermediate point along the arc length thereof. The minor axis of each opening 40 coincides with a diameter of the shaft 10, so that a setpunch 42 or the like may be applied to the knee strip 44 which remains between the opening 40 and the outer periphery of the jaw, to articulate the tip portion 38' of the jaw 38 about the point 46 of intersection of the axis with the inner periphery of the jaw, in the manner of FIG. 8, the proximate end portions 38'' of the jaws 38 meanwhile serving as part of the bight connection 48 between the tip portions 38', in this second-stage operation of a FIGS. 1-4 type collar.

I claim:

1. A split mechanical collar for a shaft comprising collet means defining a pair of coplanar jaws which have a bight connection therebetween, and which are spaced apart from one another by a recess that opens between the jaws opposite the bight connection to receive the shaft in abutment with the connection, said collet means having at least one additional recess therein on the opposite side of the bight connection from the shaft receiving recess, whereby the jaws can be rotated about the connection, drive means connected to the collet means across the additional recess, in spaced relationship to the bight connection, and movable in relation to the collet means to cause the jaws to rotate relatively about the bight connection, and means for detaining the drive means against movement in the relatively rotated condition of the jaws, the jaws being interconnected by a pair of limbs joined at an angle to one another by a knee to form a toggle connection across the additional recess which is operable to rotate the jaws when a force is applied to the knee inboard of the additional recess, and the jaws having spaced ribs outstanding thereon in the additional recess, which engage the limbs of the toggle connection to detain the toggle connection against movement when the limbs are deflected into a straight line.

2. A split mechanical collar for a shaft comprising collet means defining a pair of coplanar jaws which have a bight connection therebetween, and which are spaced apart from one another by a recess that opens between the jaws opposite the bight connection and is adapted to receive the shaft therein, said jaws being bendable with respect to the bight connection and said collet means having an additional recess therein on the opposite side of the bight connection from the shaft receiving recess, and a deflectable, V-shaped toggle connection extending across the additional recess, which is spaced apart from the bight connection and interconnected with the jaws so that the toggle connection is operable to bend the jaws into engagement with the shaft when the shaft is abutted with the bight connection and a deflecting force is applied to the apex of the toggle connection in a direction crosswise of the shaft receiving recess.

3. The split collar according to claim 2 wherein the bight connection is integral with the jaws.

4. The split collar according to claim 3 wherein the toggle connection comprises a bendable, V-shaped strip which is integral with the collet means.

5. The split collar according to claim 2 wherein the collet means has stop means outstanding thereon in the additional recess, which are engageable with the toggle connection to detain the toggle connection against movement when the toggle connection is deflected into a straight line.

6. A split mechanical collar for a shaft comprising collet means defining a pair of coplanar jaws which have a bight connection therebetween, and which are spaced apart from one another by a recess that opens between the jaws opposite the bight connection to receive the shaft in abutment with the connection, said collet means having a pair of additional recesses therein, which are spaced apart from one another by an intermediate portion of the bight connection, and disposed on the opposite side of the bight connection from the shaft receiving recess, whereby the jaws can be rotated about the connection, drive means connected to the collet means across the additional recesses, in spaced relationship to the bight connection, including a knee strip interconnecting each of the jaws with the intermediate portion across the additional recess thereadjacent, and bendable in relation to the collet means to rotate the respective jaw relatively about the bight connection when a force is applied to the strip inboard of the additional recess, and means for detaining the drive means against movement in the relatively rotated condition of the jaws.

* * * * *